(12) United States Patent
Reznik et al.

(10) Patent No.: US 8,737,297 B2
(45) Date of Patent: May 27, 2014

(54) NETWORK CODING RELAY OPERATIONS

(75) Inventors: Alexander Reznik, Titusville, NJ (US);
Eldad M. Zeira, Huntington, NY (US);
Chunxuan Ye, Wayne, PA (US); Sana Sfar, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 733 days.

(21) Appl. No.: 12/708,947

(22) Filed: Feb. 19, 2010

(65) Prior Publication Data

US 2010/0220644 A1     Sep. 2, 2010

Related U.S. Application Data

(60) Provisional application No. 61/153,998, filed on Feb. 20, 2009.

(51) Int. Cl.
*H04W 4/00* (2009.01)
*H04B 7/155* (2006.01)
*H04L 1/00* (2006.01)

(52) U.S. Cl.
CPC .......... *H04B 7/15521* (2013.01); *H04L 1/0076* (2013.01)
USPC ............................. 370/328; 370/349; 370/315

(58) Field of Classification Search
CPC combination set(s) only.
See application file for complete search history.

(56) References Cited

U.S. PATENT DOCUMENTS

| | | | |
|---|---|---|---|
| 6,247,058 B1 | 6/2001 | Miller et al. | |
| 7,912,003 B2 * | 3/2011 | Radunovic et al. | 370/329 |
| 8,228,835 B2 * | 7/2012 | Yuan et al. | 370/315 |
| 2008/0089333 A1 | 4/2008 | Kozat et al. | |
| 2008/0137586 A1 * | 6/2008 | Jones et al. | 370/315 |
| 2008/0144552 A1 * | 6/2008 | Johansson et al. | 370/310 |
| 2008/0181163 A1 | 7/2008 | Ye et al. | |
| 2008/0219251 A1 * | 9/2008 | Xue et al. | 370/389 |
| 2008/0279182 A1 * | 11/2008 | Hafeez et al. | 370/389 |
| 2009/0003216 A1 * | 1/2009 | Radunovic et al. | 370/237 |
| 2009/0041097 A1 * | 2/2009 | Lee et al. | 375/211 |
| 2010/0302996 A1 * | 12/2010 | Matsumoto et al. | 370/315 |
| 2011/0026429 A1 * | 2/2011 | Slimane et al. | 370/252 |

OTHER PUBLICATIONS

Baik, I.-J. and Chung, S.-Y., "Network Coding for 2-Way Relay Channels Using Lattices," *Proceedings ICC* 2008, 3898-3902.

He et al., "On the energy-delay trade-off of a two-way relay network," $42^{nd}$ Annual Conference on Information Sciences and Systems, pp. 865-870 (Mar. 2008).

(Continued)

*Primary Examiner* — Bob Phunkulh
(74) *Attorney, Agent, or Firm* — Volpe and Koenig, P.C.

(57) ABSTRACT

A method for network coding of packets between End Nodes (ENs) and a Relay Node (RN) in wireless communications can be performed at the RN. This method may include: receiving a new packet at the RN from one of the ENs; determining the source node of the new packet at the RN; providing a buffer for each EN; determining whether the buffer associated with the EN that is not the source of the new packet (non-source buffer) has the new packet buffered and based upon such determination, either: (1) storing the new packet in the EN buffer that is the source of the new packet on a condition that the non-source buffer is empty; or (2) network coding the new packet with an existing packet in the non-source buffer.

20 Claims, 11 Drawing Sheets

(56) References Cited

OTHER PUBLICATIONS

IEEE Computer Society and the IEEE Microwave Theory and Techniques Society, "IEEE Draft Amendment to IEEE Standard for Local and Metropolitan Area Networks Part 16: Air Interface for Fixed Broadband Wireless Access Systems", IEEE Std 802.16m (Mar. 2008).

Karande, S. S., Misra, K., Ilyas, M. U. and Radha, H., "Adaptive Network Coding With Noisy Packets," Conference on Information Sciences and Systems (CISS), Mar. 2007.

Larsson et al., "Coded Bi-directional Relaying," IEEE Vehicular Technology Conference, vol. 2, pp. 851-855 (Jul. 2008).

Mahmino et al., "Guaranteed Packet Delays with Network Coding," $5^{th}$ IEEE Annual Communications Society Conference on Sensor, Mesh and Ad Hoc Communications and Networks Workshops, pp. 1-6 (Jun. 2008).

Wu, Y., Chou, P.A., and Kung, S. Y., "Information Exchange in Wireless Networks With Network Coding and Physical-Layer Broadcast," Conference on Information Sciences and Systems (CISS), Mar. 2005.

Yeung, Raymond W., "Information Theory and Network Coding," Springer 2008, Chapters 11 and 15.

Zamir, R., Shamai, S. and Erez, U., "Nested Linear/Lattice Codes for Structured Multiterminal Binning," *IEEE Tr. Information Theory*, vol. 48, pp. 1250-1276, Jun. 2002.

He et al., "On the energy-delay trade-off of a two-way relay network," $42^{nd}$ Annual Conference on Information Sciences and Systems, pp. 865-870 (Mar. 2006).

Hou et al., "Distributed Turbo Coding Schemes for Asymmetric Two-Way Relay Communication," IEEE International Symposium on Turbo Codes and Related Topics, pp. 237-242 (Sep. 2008).

Huang et al., "TCP Performance in Coded Wireless Mesh Networks," IEEE Communications Society on Sensor, Mesh, and Ad Hoc Communications and Networks, pp. 179-187 (Jun. 2008).

Katti et al., "XORs in the Air: Practical Wireless Network Coding," IEEE/ACM Transactions on Networking, vol. 14, No. 3, pp. 497-510 (Jun. 2008).

Larsson et al., "Coded Bi-directional Relaying," IEEE Vehicular Technology Conference, vol. 2, pp. 851-855, (Jul. 2008).

Liu et al., "Network Coding for Information Exchange between Multiple Node in Wireless Networks," IEEE Vehicular Technology Conference, pp. 51-55 (May 2008).

Tomozei, "Wireless Protocols Using Network Coding: Report on on State-of-the-Art," ICT—Information and Communication on Technologies, pp. 1-29 (Jan. 2009).

Various, "One-way Compression Function," pp. 1-5 (Feb. 2009), retrieved from http://en.wikipedia.org/w/index.php?title=one-way_compression_function&oldid=271848714.

Xiao et al., "A Network Coding Approach to Cooperative Diversity," IEEE Transactions on Information Theory, vol. 51, No. 10, pp. 3714-3722 (Oct. 2007).

\* cited by examiner

NETWORK CODING RELAY OPERATIONS

CROSS REFERENCE TO RELATED APPLICATIONS

This application claims the benefit of U.S. provisional application No. 61/153,998 filed Feb. 20, 2009, which is incorporated by reference as if fully set forth herein.

FIELD OF INVENTION

This application is related to wireless communications.

BACKGROUND

Wireless technologies continue to evolve, mostly driven by the need for reliable higher data rates. One example of this evolution is the next generation of the Third Generation Partnership Project (3GPP) wireless standard known as Long Term Evolution (LTE). Although the current description discusses LTE in detail, the hardware, software, methods, and systems described herein could be used in other wireless settings such as in without limitation, High Speed Downlink Packet Access (HSDPA) systems or WiMAX IEEE 802.x standards.

Network coding allows a relay node (RN) to reduce the air interface utilization by one time slot because upon receipt of packets from two end nodes (ENs), the RN creates a single m-bit packet p that may be obtained as a bit-wise XOR of the received packets. RN then forwards p to both ENs, EN1 and EN2. EN1 recognizes p1 sent by EN1 and therefore, upon reception of p, EN1 bit-wise XORs p1 and p that results in p2 sent by EN2. EN2 obtains p1 from p2 and p in the same way. This approach to network coding provides air interface savings in relaying data but the above example ignores several issues that may arise during real-world transmission. Moreover, these issues are not adequately addressed in the art today.

First issue: Different packet sizes. The packets p1 and p2 that EN1 and EN2 transmit are often different sizes, thus the bit-wise XOR operation is not well defined in this case and may lose much of the efficiency apparent in the simple example above.

Second issue: Different transmission rates. EN1 and EN2 often transmit at different packet rates. For example, if EN1 is transmitting at a higher rate, not all of EN1's packets can be network coded—there are simply more of EN1's packets at the RN than EN2's packets. Depending on latency constraints, the scheduler may be able to cause same time transmission. There is a penalty because—especially during Below Rooftop (BRT) deployment—it must then give up some opportunistic gain. In this situation, if the number of bits is different, the gain from network coding diminishes. When relay is used herein, such a relay is preferentially (but not necessarily) part of network infrastructure. For such a relay, it is common to distinguish between a deployment below or above the roof top lines (abbreviated as BRT and ART respectively) since the wireless signal propagation differs significantly between the two cases.

Third issue: Buffer overuse. The transmitter discards a packet once it receives an acknowledgement of its reception by a receiver. For example, when EN1 sends p1 to RN, EN1 discards p1 either upon receiving an ACK from RN, or upon transmission (if the operation is unacknowledged). In order to perform decoding of network coding packets, however, transmitted packets p1 and p2 need to be kept in buffers by EN1 and E2. This introduces additional burden on the MAC that manages the buffer and also overly taxes resources with increased buffer size.

Fourth issue: Packet transmission times are not synchronized. Thus, a transmitter EN does not implicitly know which of its transmitted packets were combined into a network coded packet at the relay node RN. There needs to be a method for the RN to indicate to each EN that it network-encoded the EN's packet. This issue is related to the previous one because this packet must still be in the MAC buffer at the time that a network coded packet is received. Otherwise, network decoding will fail.

Fifth issue: Addressing of noisy channels and Hybrid Automatic Repeat reQuest (HARQ). For example, consider the case that a network-coded packet is not received by one of the intended ENs. The appropriate corrective action requires a different network coding operation at the RN as the EN that has received the packet no longer needs a re-transmission.

Sixth issue: While network coding is traditionally achieved using bit-wise XOR, in this case such an operation may be sub-optimal as it fails to take full advantage of the opportunities provided by operating in the Physical Layer of the communication system. Thus, a more sophisticated approach to network coding is desired.

Hence, what is needed is a method and related apparatus that addresses the obstacles and issues.

SUMMARY

A method for network coding of packets between End Nodes (ENs) and a Relay Node (RN) in wireless communications can be performed at the RN. This method may include: receiving a new packet at the RN from one of the ENs; determining the source node of the new packet at the RN; providing a buffer for each EN; determining whether the buffer associated with an EN that is not the source of the new packet (non-source buffer) has the new packet buffered and based upon such determination, either: (1) storing the new packet in the EN buffer that is the source of the new packet on a condition that the non-source buffer is empty; or (2) network coding the new packet with an existing packet in the non-source buffer.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Figure 1:
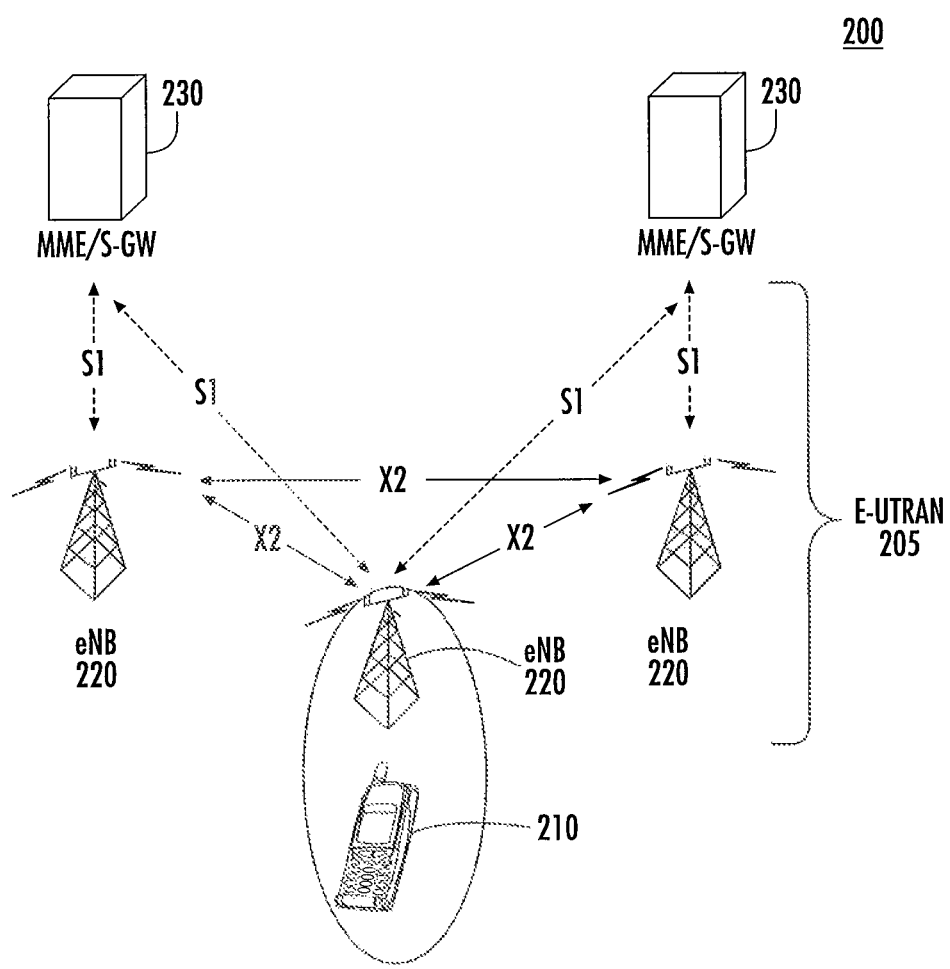
FIG. 1 shows a LTE wireless communication system/access network.

Goals of LTE (as well as other wired and wireless standards) include higher spectral efficiencies, lower latency, and higher peak data rates as compared to previous generations of wireless standards. FIG. 1 shows an LTE wireless communication system/access network 200 that includes an Evolved-Universal Terrestrial Radio Access Network (E-UTRAN) 205. The E-UTRAN 205 includes a wireless transmit/receive unit (WTRU) 210 and several evolved Node-Bs (eNBs) 220. The WTRU 210 is in communication with an eNB 220. The eNBs 220 interface with each other using an X2 interface. Each of the eNBs 220 interface with a Mobility Management Entity (MME)/Serving GateWay (S-GW) 230 through an S1 interface. Although a single WTRU 210 and three eNBs 220 are shown in FIG. 1, it should be apparent that any combination of wireless and wired devices may be included in the wireless communication system access network 200.

Figure 2:
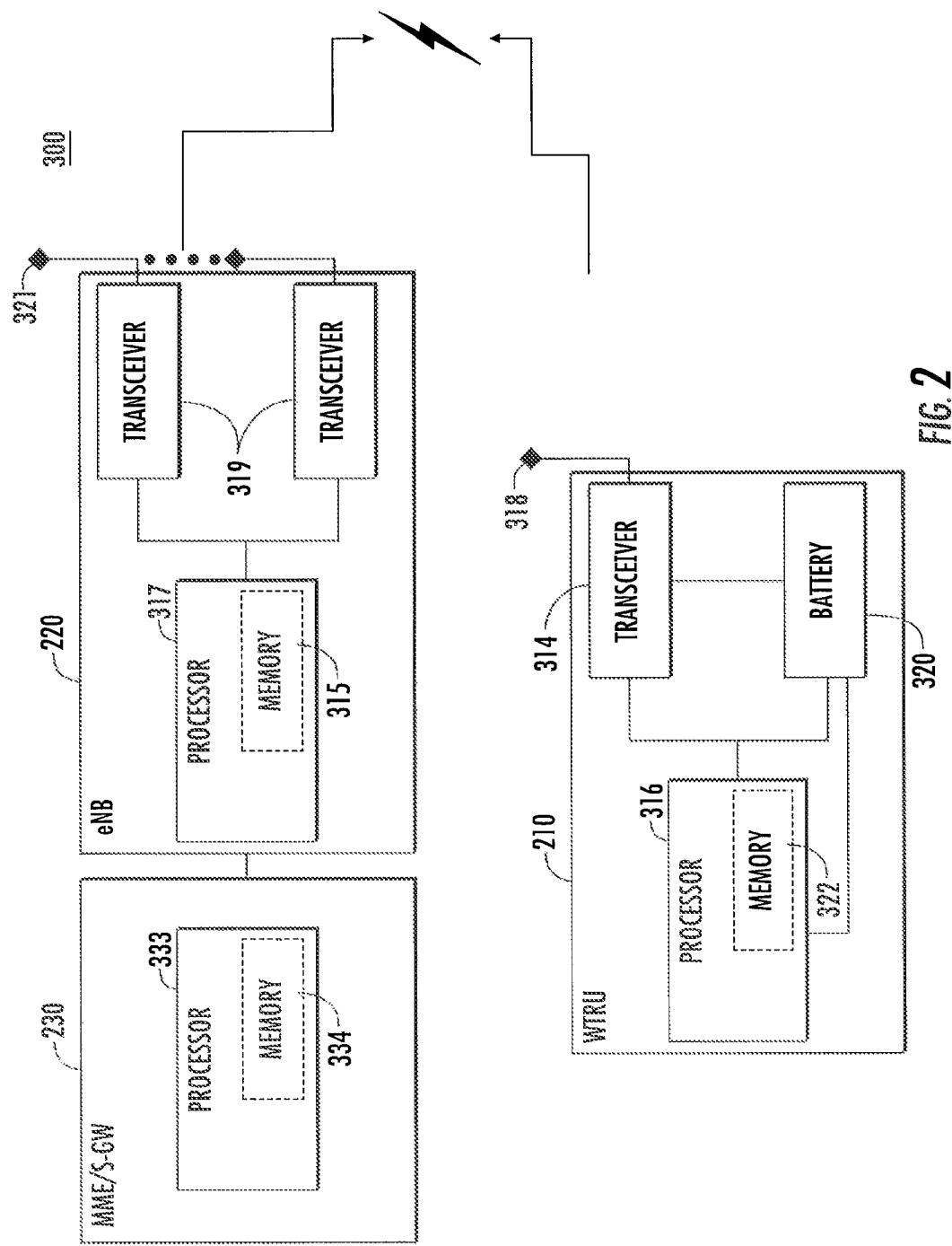
FIG. 2 is an exemplary block diagram of an LTE wireless communication system.

FIG. 2 is an exemplary block diagram of an LTE wireless communication system 300 including the WTRU 210, an eNB 220, and an MME/S-GW 230. As shown in FIG. 2, the WTRU 210, the eNB 220 and the MME/S-GW 230 may perform MAC and PHY layer operations for network coding relays.

In addition to the components that may be found in a typical WTRU, the WTRU 210 includes a processor 316 with an optional linked memory 322, at least one transceiver 314, an optional battery 320, and an antenna 318. The transceiver 314 is in communication with the processor 316 and the antenna 318 to facilitate the transmission and reception of wireless communications. In case a battery 320 is used in the WTRU 210, it powers the transceiver 314 and the processor 316.

In addition to the components that may be found in a typical eNB, the eNB 220 includes a processor 317 with an optional linked memory 315, transceivers 319, and antennas 321. The processors in the system are configured to perform MAC and PHY layer operations for network coding relays. The transceivers 319 are in communication with the processor 317 and antennas 321 to facilitate the transmission and reception of wireless communications. The eNB 220 interfaces with the MME/S-GW 230, which includes a processor 333 with an optional linked memory 334.

Figure 3:
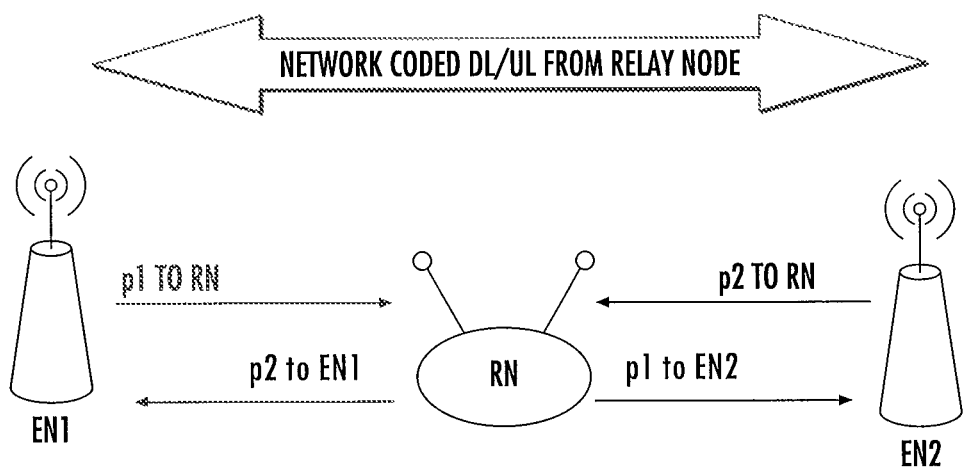
FIG. 3 shows the interaction between the ENs and the RN.

FIG. 3 generally shows the interaction between the End Nodes (ENs) EN1 and EN2 and the Relay Node (RN) in a wireless network. In FIG. 3, EN1 may be an evolved eNodeB and EN2 may be a WTRU or vice versa with the link direction changing, i.e. DL to UL and UL to DL. The RN receives the packets p1 and p2 from the ENs and creates a combined packet p data stream by network coding based upon the methods described herein and optimizes the Medium Access Control (MAC) and Physical (PHY) Layer operations for network coding. It is within this general framework that this description discusses the below methods and systems, although deviations from FIG. 3 are possible.

In certain wireless networks, nodes may relay information between other network nodes using network coding. One such simple setup includes 3 nodes as shown in FIG. 3: an End Node 1 (EN1), an End Node 2 (EN2), and a Relay Node (RN). When referred to herein, the term 'relay' may refer to a relay node, or an intermediary network node that may provide a link between a Node-B and a WTRU, which could be considered end nodes (ENs).

Consider an example using FIG. 3: EN1 needs to transmit a packet p1 of size m bits to EN2, while at the same time, EN2 needs to transmit a packet p2 of the same size (m bits) to EN1. EN1 and EN2 use the RN to send and receive data. As described in this simple communications example, this communication process requires at least the following steps: (1) EN1 sends p1 to RN; (2) EN2 sends p2 to RN; (3) RN sends p1 to EN2; and (4) RN sends p2 to EN1.

1. Network Coding

This section discusses network coding packets of unequal length. There are two approaches described here: network coding before the channel coding (i.e. before the single network coded packet is channel-encoded) and network coding after the channel coding (i.e. two source packets are separately encoded and then the output is network coded).

The network coding may be used to combine the packets in one of the following ways.

(1) Zero-pad a shorter packet to the longer packet's length. Consider an example where p1 is a packet of L1 bits and p2 is a packet of L2 bits, where L1>L2. To combine packets p1 and p2, the packet p2 may be zero-padded to increase its length to L2 bits. The resulting combined packet p has a length 2L1 and can be XORed to extract p1 and p2 from p.

(2) Perform the summation in the ring of positive integers modulo some maximal value.

(3) Perform repetition of bits in the packet p2 with the shorter length to match the larger packet p1 and then XOR the resulting packets.

(4) Some or all of the above approaches can be used to combine more than two packets at a time.

Figure 4:
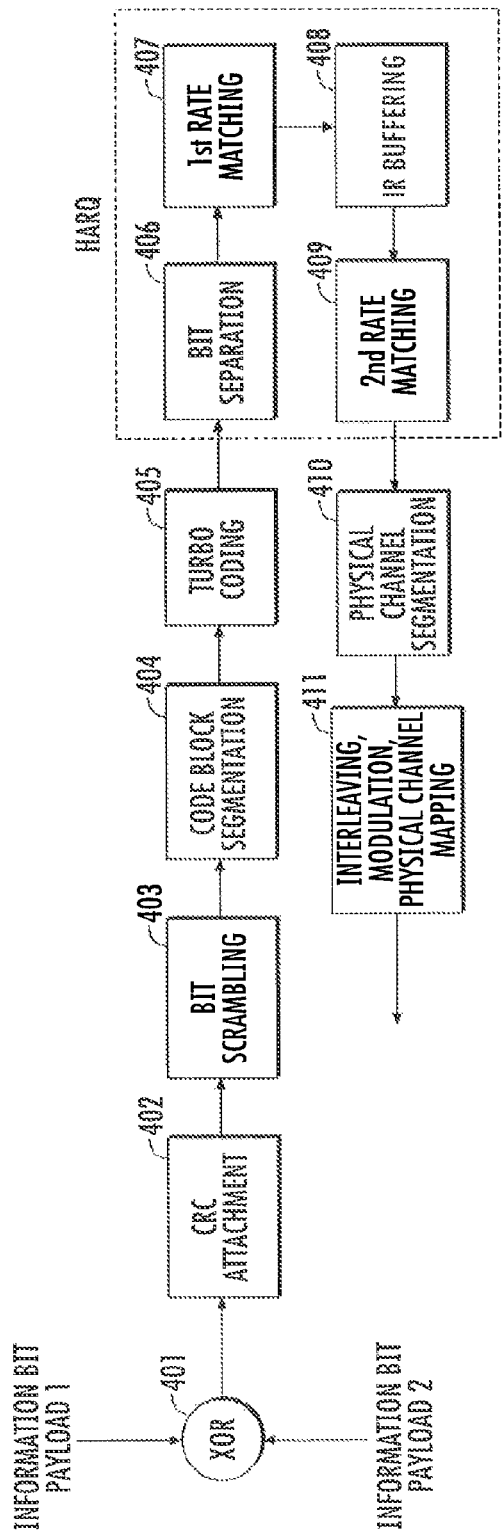
FIG. 4 shows High-Speed Downlink Shared Channel (HS-DSCH) channel encoding chain for a combined packet.

FIG. 4 shows High-Speed Downlink Shared Channel (HS-DSCH) channel encoding. An XOR operation may be performed at any step from original source packet receipt to the beginning of turbo coding. XORing can be performed before and after CRC attachment without significant difference. FIG. 4 shows an example of XORing (401) information bits before CRC attachment 402. The HS-DSCH encoding steps include CRC attachment 402, bit scrambling 403, code block segmentation 404, turbo coding 405, bit separation 406, 1st rate matching 407, IR buffering 408, 2nd rate matching 409, physical channel segmentation 410, and interleaving, modulation, and physical channel mapping 411.

The XOR operation may also be performed at any step from the output of turbo coding to IR buffering. Since all transmitted packets in HSDPA are automatically stored in an IR buffer, it may be convenient to XOR the bits of the two missing packets which are stored in the IR buffer.

XORing packets p1 and p2 of different sizes into packet p may cause performance challenges as packet sizes increase. The challenge may be alleviated partially using rate matching (puncturing and/or repetition). For example, puncturing is the process of removing some parity bits after encoding with an error-correction code. This has the same effect as encoding with an error-correction code with a higher rate, or less redundancy. With puncturing, however, the same decoder can be used regardless of how many bits have been punctured, thus puncturing considerably increases the flexibility of the system without significantly increasing its complexity. No matter what rate matching method is used, rate matching may be used to equalize the number of coded bits associated with two source packets of unequal length. But puncturing and repetition in excessive amounts (e.g. by a factor of two or more) may severely degrade link performance.

A. Network Coding the Coded Packets

Using modulations of high order to allow for equalization of packets of different length to overcome the problems described is provided here. This approach allows for "coarse" equalization—fine equalization is then accomplished by standard rate matching techniques. The coarse approach as described may equalize packets to within a factor of two. Moreover, the coarse equalization approach is designed to increase the effective Signal-to-Noise-Ratio (SNR) afforded to the lower-rate packet, thus maximizing the performance advantage that can be delivered to a link.

i. QPSK and BPSK

Figure 5:
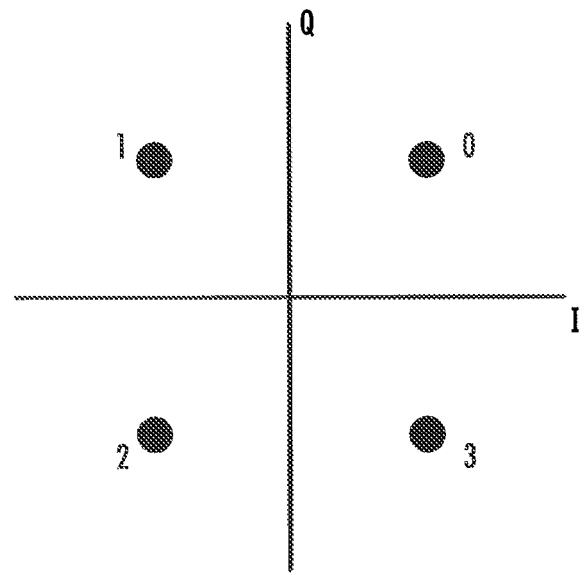
FIG. 5 shows a Simple Quadrature Phase Shift Keying (QPSK) modulation alphabet.

As an example, consider a requirement to network code two packets, p1 and p2, and suppose p2 contains m (coded-and rate-matched) bits, while p1 contains 2m bits. Packet p1 may be modulated using the full quadrature phase shift keying (QPSK) modulation alphabet (or other suitable modulation code) as shown in FIG. 5 (resulting in 2 bits per modulation symbol), p2 is modulated using 1 of 2 binary phase shift keying (BPSK) sub-modulation alphabets available in the QPSK modulation alphabet. For example, symbols 0 and 2 may be used for modulation of p2. Thus, p2 is modulated using 1 bit per channel symbol, and both p1 and p2 are then modulated into m modulation symbols.

Assume these packets now need to be combined (network coded). The network coding combination scheme might be as follows: let $s_{i,1}$ be the $i^{th}$ modulation symbol for p1 and $s_{i,2}$ be the $i^{th}$ modulation symbol for p2. Then the output modulation symbol is given by $$s_i = (s_{i,1} + s_{i,2}) \bmod 4 \quad [1]$$

Figure 6:
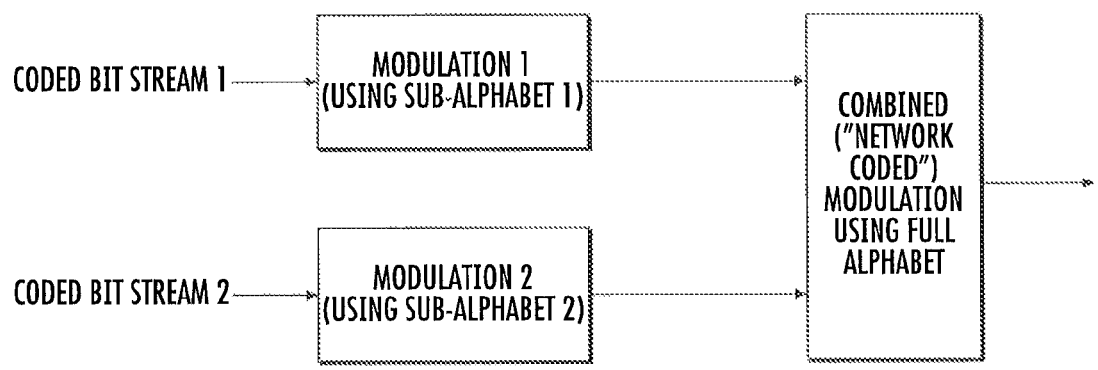
FIG. 6 shows general network coding at modulation process.

The general process as illustrated by the example is shown in FIG. 6.

The following three observations can be made about the example. First, the output modulation scheme is fixed at QPSK—more specifically, it is fixed by design. Moreover, the output remains balanced, that is, each symbol occurs at the output with equal probability (assuming equiprobable bits at each input bit stream). Second, the receiver of packet p1 (which knows p2) cancels out p2 and benefits from simple QPSK modulation. Third, the receiver of packet p2 (which knows p1) cancels out p1 and benefits from simple BPSK modulation. In particular, this receiver enjoys a 3 dB channel SNR difference after the removal of contribution from p1.

This approach can be extended beyond just BPSK/QPSK to more general modulation schemes, while recognizing certain issues to arrive at a design that offers good performance.

First, the modulation scheme may to be fixed: The output may retain all the necessary symmetries in the complex plane to avoid I/Q imbalance, DC offset and other issues (in particular, circular symmetry around the origin and symmetry around the I and Q axis). While an equiprobable output is targeted, this may not always be possible and the symmetry maintenance requirement above is sufficient to ensure low impact on performance and operation of most systems.

Second, the receiver of the lower-rate packet should benefit from an SNR improvement roughly equal to the ratio of the rates between the higher rate and the lower rate packets.

The QPSK/BPSK example above achieves these two goals, but a broader range of communication system designs are possible while achieving the design goals. Some of these designs are discussed herein.

ii. M-PSK

An M-PSK modulation scheme may be described as one whose alphabet consists of the following points in the complex plane:

$$A_{M-PSK} = \left\{ \exp\left(j2\pi\left(\frac{m}{M} + \phi\right)\right) \right\}, m = 0, 1, \ldots, M-1 \quad [2]$$

where M is a positive integer (where it is sufficient to consider M≥4).

In other words, M points are placed equidistantly around a unit circle in the complex (I/Q) plane. The fixed angle $\phi$ controls the angular rotation of the modulation. Modulation mapping is the process of mapping the bit stream into values $0, 1, \ldots M-1$. Let $M_1$ and $M_2$ be factors of M (i.e. $M_1$ and $M_2$ divide M). Then the following modulation alphabets define sub-modulation with index i and $M_i$ value of M-PSK:

Start with the full alphabet as in [2].
Use only values $$m\frac{M}{M_i},$$

m=0, 1, . . . , $M_i$−1.

The operation of network coding at the modulation level is accomplished as follows: (1) Given integers $m_1 \in \{0, 1, \ldots, M_1-1\}$ and $m_2 \in \{0, 1, \ldots, M_2-1\}$ representing the desired modulation symbols for 2 streams to be network coded, (2) compute $$m = m_1 \frac{M}{M_1} + m_2 \frac{M}{M_2}$$

and map m into the M-PSK constellation according to [2].

Upon reception of a modulation symbol m, and with knowledge of $m_1$, a receiver may recover $m_2$. Moreover $m_2$ may be mapped into a proper $M_2$-PSK constellation thus retaining all the required symmetry properties. Similarly the receiver with knowledge of $m_2$ may recover $m_1$.

The output of the transmitter may be mapped into a PSK constellation with the number of symbols equal to the least common divisor of $M_1$ and $M_2$ (LCD($M_1$, $M_2$)). Because, M≥LCD($M_1$, $M_2$), this is either the M-PSK constellation or a proper sub-constellation of M-PSK.

To extend this to a more general set of rates between the two inputs, a similar process can be used for an M-PSK case as follows:

(1) Label the full lattice with integer labels from the set $\{0, \ldots, M-1\}$—which is the transmission alphabet for the full modulation. Each sub-modulation has an alphabet $\{0, \ldots, M_i-1\}$, (associated with sub-lattice i) such that $M_i$ divides M. Make sure the full lattice is labeled such that each coset center has a label $$m\frac{M}{M_i},$$

m=0, 1, . . . , $M_i$−1.

(2) Network code as follows. Input stream i, take on values $m_i \in \{0, 1, \ldots, M_i-1\}$. The modulation code for any two streams (e.g. streams 1 and 2) is derived as follows:

$$m = m_1 \frac{M}{M_1} + m_2 \frac{M}{M_2} \qquad [3]$$

The following properties are noted: (1) the resulting modulation symbol is always a point in the mother lattice and the result is balanced; and (2) following network decoding, the modulation is always constrained to the sub-lattice and therefore carries the benefit of the improved minimum distance of that sub-lattice. For example, receiver 1, upon observing m, can remove the contribution from $m_1$. The remaining index is $$m_2 \frac{M}{M_2},$$

which is by definition a coset center in sub-lattice 2.

iii. PAM and QAM Constellations:

Higher order modulation (described as modulation on a lattice) insures that packets with unequal numbers of bits results in the same number of channel symbols by mapping larger packets into a higher order modulation alphabet (more bits per channel symbol) and smaller packets into lower modulation alphabets. Unfortunately, this approach attempts to use power scaling at the RN to adjust performance. This results in "unspecified" modulation at the relay that can cause transmitter problems (increase pair-to-average power ratio (PAPR)) as well as performance degradation at the receiver.

Unlike previously presented methods, there is a need for fixing the lattice from which the modulation alphabet for the RN is defined (as well as the alphabet itself) and network coded into this lattice.

One possible approach is to use nested lattices, which is a lattice that contains a sub-lattice that is self-similar to the "mother lattice"—i.e. it is just a scaled up version of the mother lattice. Modulation alphabets defined by restricting such sub-lattices will also contain self-similar sub-alphabets (provided the restriction is done properly). This is illustrated using a square lattice as shown in FIG. 12 and describes how this restricts to a 16-QAM modulation alphabet with a 4-QAM (QPSK) sub-alphabet modulation scheme.

Figure 12:
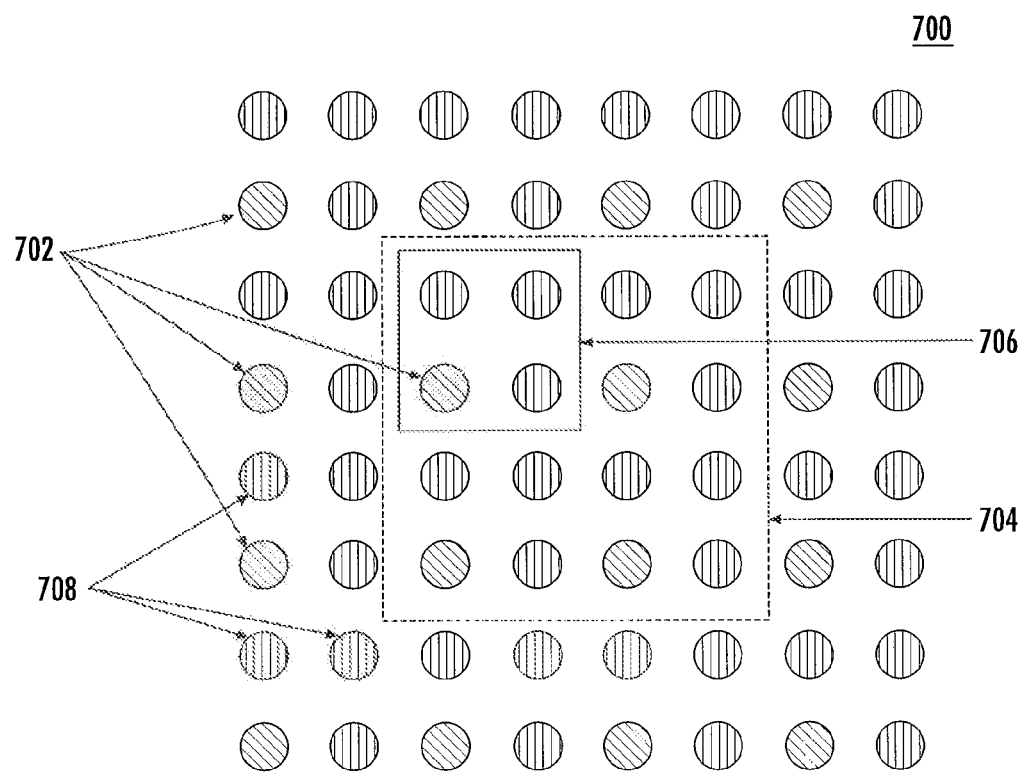
FIG. 12 shows an infinite square lattice including a sub-lattice.

FIG. 12 depicts an infinite square lattice 700 showing a sub-lattice composed of diagonally cross hatched points depicted as elements 702 and vertically hatched points depicted as elements 708. A square with dashed lines, element 704, outlines a finite 16-QAM constellation with the origin of the complex plane properly located. Sub-lattice points of the resulting 16-QAM constellation (element 704) are a (DC-shifted) QPSK constellation. The DC shift is easily corrected as part of "network-decoding."

With each sub-lattice point, a set of points in its "neighborhood" can be associated—i.e. a coset of that sub-lattice. In FIG. 12, such a coset is depicted by the element 706 containing four such sub-lattice points. Each coset is therefore in a 1-to-1 relationship with a single sub-lattice point, which is called the coset center, even if it is "visually" not in the center of the coset.

The network coding process proceeds as follows. Suppose first that the first stream requires the use of a full modulation alphabet, while the second stream is lower rate and requires the use of a (restricted) sub-lattice. The process then proceeds as follows:

(1) Separate the first stream into 2 bits streams—one of the same rate as the second stream.

(2) The two streams of the same rate (the sub-stream of the first stream and the second stream) are network coded. This may be done in several ways: A traditional bit-wise XOR or more generally any map which maps a pair of sub-lattice points to a new sub-lattice point and is invertible when one of the two original arguments is given.

(3) The output of the network coding of sub-streams selects a sub-lattice point, while the remaining portion of the first stream selects a point in the coset associated with that sub-lattice point.

This approach has certain properties. First the output is well-balanced—all points are equiprobable. Second, the receiver of the lower rate packets gains the SNR advantage associated with coding to a sub-lattice.

2. MAC Packet Buffering and Indexing

The issues of Medium Access Control (MAC) packet buffering and indexing are addressed with the goal of making sure that the information necessary for network decoding is available at the transmitter node and that this is done with the least possible increase in the node's complexity (processing and memory requirement) and lower interface overhead. For this, a type of network coding is used that does not require an identical number of bits.

A. Method 1

Figure 7:
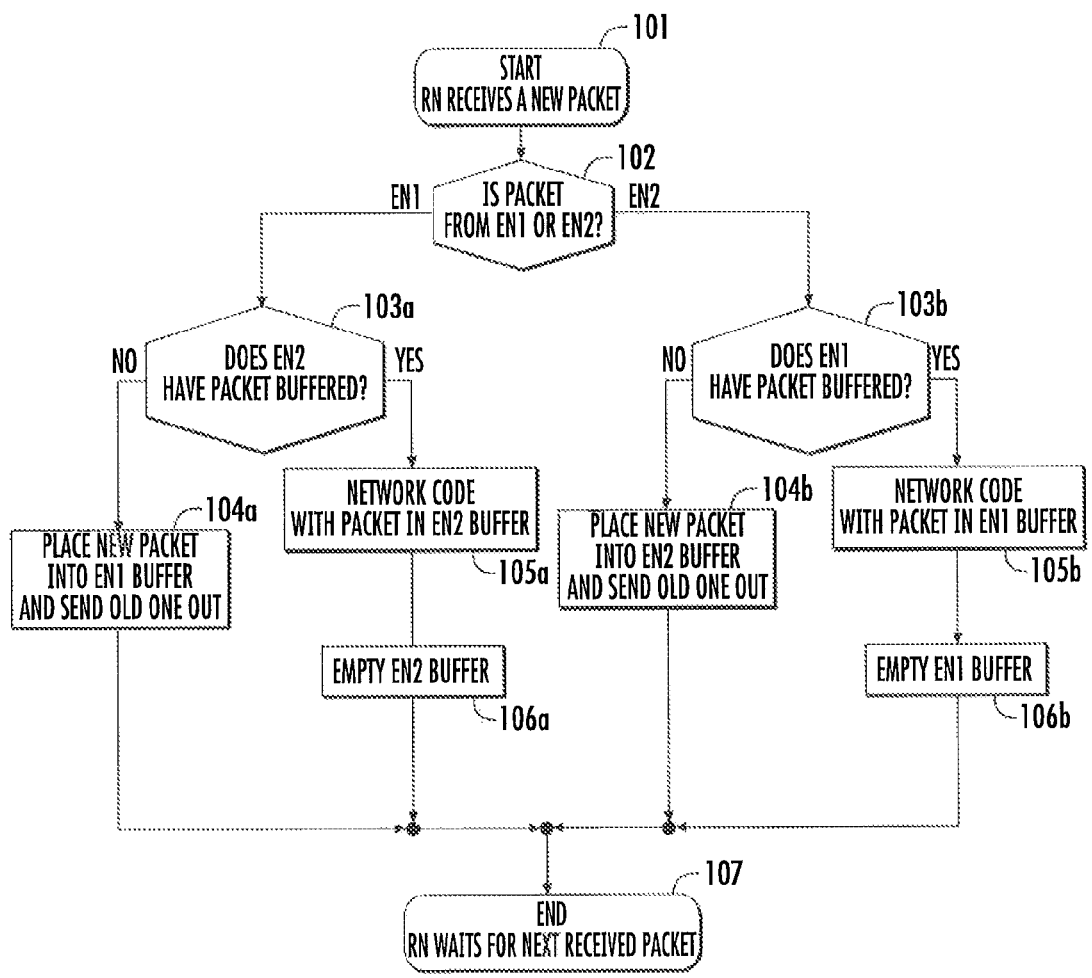
FIG. 7 shows Relay Node (RN) operation under a method 1 with two End Nodes (ENs).

FIG. 7 illustrates this method in a flowchart for two End Nodes (ENs). In the method, a relay node (RN) buffers at most one packet for each EN. Upon reception of a packet from another EN, the RN network codes the buffered packet with the newly received one. If the RN receives a packet from an EN for which it has a packet buffered already, it replaces the older packet with the new one. The packet being discarded from the buffer still needs to be delivered to its intended EN—and is therefore transmitted by itself, with no network coding.

FIG. 7 shows relay node (RN) operation starting with the RN's receipt of a new packet 101. Upon receipt of the packet, the RN determines the source of the packet (EN1 or EN2) 102 and looks to the buffer associated with the other destination EN 103*a*, 103*b* (the non-source buffer). If this buffer is empty, the received packet is stored in the source RN buffer. The source RN buffer may or may not be empty; if it is not empty the new packet replaces the buffer content and the old packet is sent out without network coding 104*a*, 104*b*. If the buffer contains a packet, the two packets are XORed and the buffer for the other EN is emptied 105*a*, 106*a*, 105*b*, 106*b*. The RN then awaits the next received packet 107. This process assumes that no two packets are ever received simultaneously, however if this occurs (i.e. two packets—one from EN1 and one from EN2 are received at the RN at the same time), one of the packets is arbitrarily assumed to have been received first.

The method can be modified so that only one buffer is kept, and, thus, the step 102 from FIG. 7's method is eliminated (as well as the corresponding steps related to the second EN). This results in the modified flowchart of FIG. 8 that shows similar steps as FIG. 7's: receiving a new packet 201, checking the buffer 203, and buffering and sending 204 or network coding 205 and emptying buffer 206, and finally awaiting more packets 207.

Figure 8:
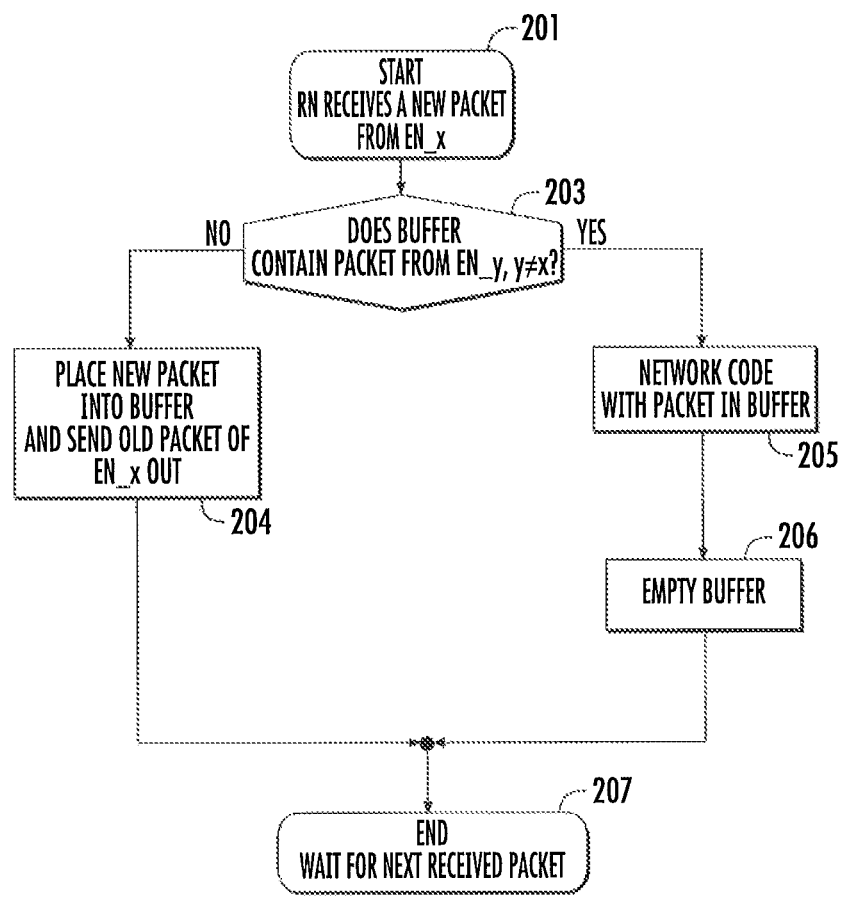
FIG. 8 shows single buffer RN operation.

The method shown in FIG. 8 has an advantage of having a minimal buffer size; however it provides no ability for the RN to choose packets for network coding that may be most appropriate—for example packets that may be of roughly equal size.

Such an ability can be achieved through the modification of the method in FIG. 7. In such a modified method, the RN buffers multiple packets for each EN. The packets contain headers or other means of identification that uniquely identify their contents. If the RN receives a packet from an EN for which it has packets already, it sends the oldest packet out without network coding and buffers the new one in.

With this modification, two choices arise. When a packet arrives from EN1, the new packet can be either: (1) coded with some packet from EN2 and only buffer in the EN1 buffer if the EN2 buffer is empty (Method 1a), or (2) buffered automatically and then look over the packets in the EN1 and EN2 buffer and choose the best pair of EN1 and EN2 packets to network code (a packet may be matched as soon as it arrives, in which case it does not have to be buffered).

These approaches are described below in further detail.

i. Method 1a

Figure 9:
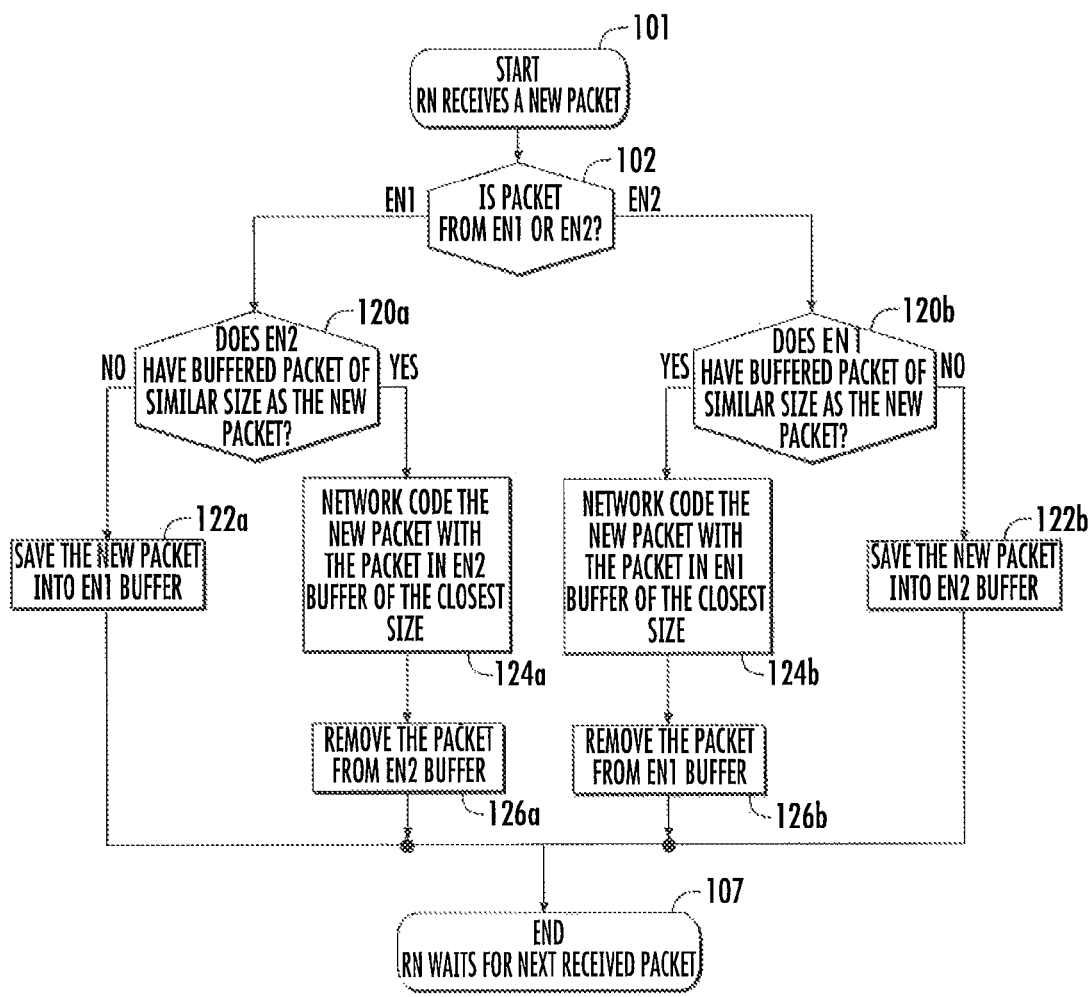
FIG. 9 shows RN operation under a method 1a with 2 ENs.

FIG. 9 summarizes the Method 1a. Upon a successful reception of any packet 101, the RN determines the source of the packet (EN1 or EN2) 102 and looks to the buffer associated with the other EN. At step 120a, 120b, if this buffer is empty or has no similar-sized packet as the other packet's buffer, the received packet is stored in the source RN buffer 122a, 122b. If the buffer for the other EN contains one or more packets, the RN selects the packet that is closest in size (optionally on a condition that the size difference does not exceed a given value) 124a. The two packets are XORed and the previously stored packet is removed from this buffer 126a. This process assumes that no two packets are ever received simultaneously, however if this occurs (i.e. two packets—one from EN1 and one from EN2 are received at the same time), one of them is arbitrarily assumed to have been received first. Packet header or other side information may specify which packets may be concatenated or split in order to equalize packet size for XORing operation.

This procedure is similar to the procedure described in FIG. 7, with the following modifications: (1) The EN buffers can buffer more than 1 packet, and (2) When a packet from a buffer is used, the buffer is not emptied—rather only that packet is removed.

As with FIG. 8's modification of the method of FIG. 7, the two buffers may be replaced with a single buffer per pair with the following modifications: (1) The buffer may buffer more than one packet; and (2) When a packet from a buffer is used, the buffer may not be emptied—rather only that packet is removed.

ii. Method 1b

Consider a method where both the EN buffers may contain packets. This is different from the methods of FIGS. 7 and 8. In particular, there would not likely be any substitution of a single buffer (as in FIG. 8). A single buffer can be created for a pair of ENs, but it does not produce a factor of 2 savings in storage that are realized in going from FIG. 7 to FIG. 8 because of the increased buffer storage required. Moreover, the single buffer requires that the packets in the buffer be labeled with their source EN, which in effect creates multiple EN buffers implemented as a single actual one.

Multi-packet buffers in Method 1a or Method 1b address the problem of mismatched packet size but may suffer from delays. A packet from an EN may be delayed by the RN for an unreasonably long time—which may have a negative impact both on system performance and the buffer size required at the RN and at the ENs. This problem is addressed through a further improvement described below.

iii. Method 1c

Now consider a condition that the EN's and/or RN's buffer size is limited, or there is a latency constraint on the RN. Faced with this limitation, the RN should send out the packets that have been stored for a predetermined longer time, either without XORing with another packet or XORing with a packet of an unmatched size. This alternative balances the bandwidth performance (or efficiency of network coding) and storage requirements.

Figure 10:
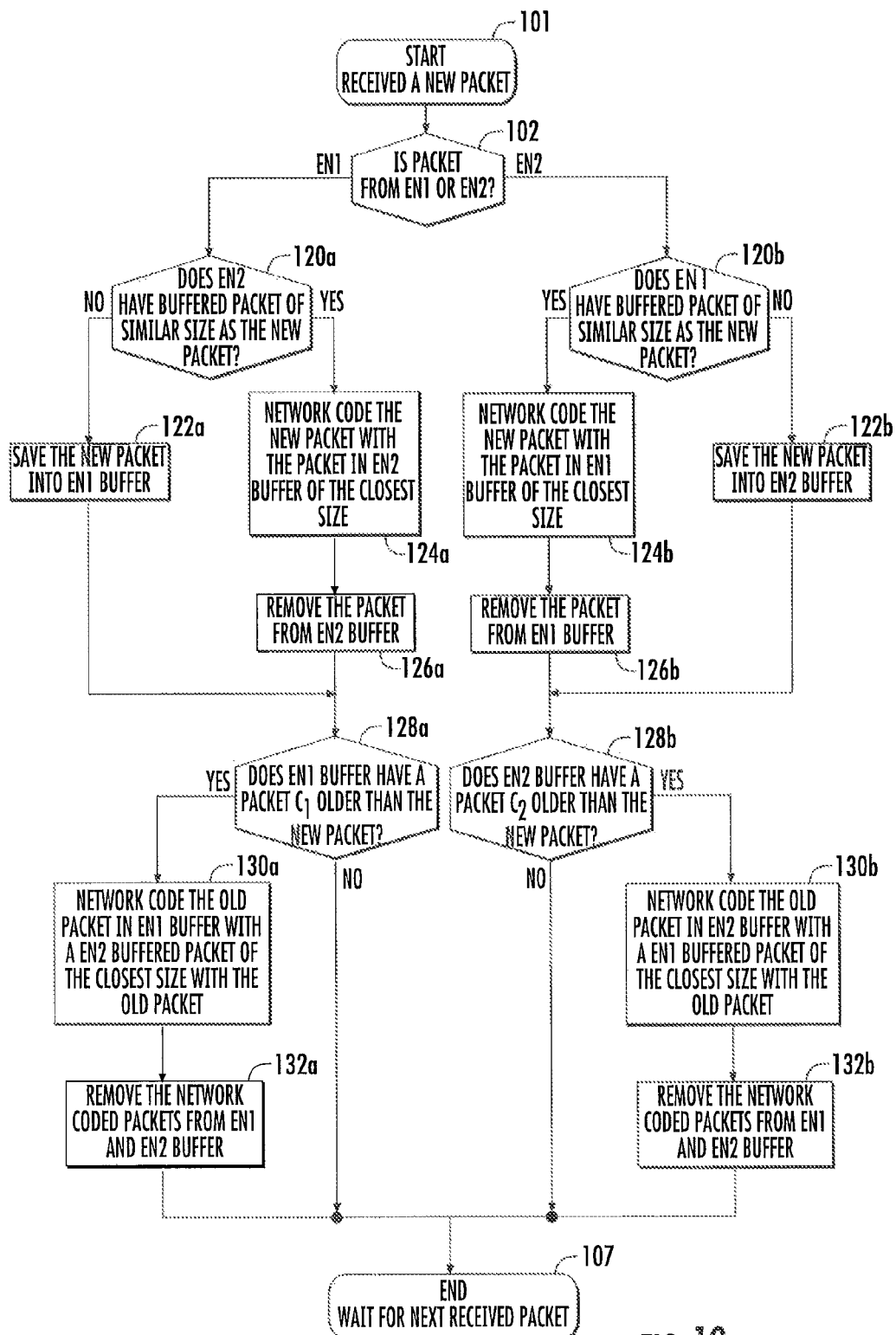
FIG. 10 shows RN operation under a method 1c with 2 ENs.

The method is illustrated in FIG. 10. Once the RN receives a packet, it first deals with the new packet as in Method 1a or 1b and shown in steps 101, 102, 107, 120, 122, 124, and 126. After that, it checks its buffer to see if there is an old packet 128a, 128b, which may be network coded with a packet in the other buffer of a similar size (if possible) 130a, 130b. Then the packets are removed from the EN1 or EN2 buffers 132a, 132b. If so, it sends out the old packet (preferable to XOR with another packet even without matched size).

In case the RN's buffer size is limited, this process can be modified as follows by replacing the step 128a, 128b with a step that asks: "Does the EN1 (or EN2) buffer have a packet C1 (or C2) older than the new packet or is the EN1 (or EN2) buffer full?"

If the RN receives a packet from the $EN_i$, it proceeds to match it and code it or buffer it, as per Method 1a or 1b. If the incoming packet is matched (and network coded, as opposed to buffered), the matching procedure takes into account both the length of the packets (prefers packets of more similar lengths) and the duration of time that a packet has been kept (prefers to match with older packets). Various tradeoff methods may be used to rate packets. For example, the following formula provides a general framework for producing rated scores between 0 and 1, with 1 being better and giving preference to better length matched and older packets. Other frameworks may be used—as the formula is just one example for score computation.

$$\text{score} = av(f(\text{length1}, \text{length2}), g(\text{buffered age})) \quad [3]$$

where g(x) is a function that takes an integer value (packet age) and produces a value between 0 and 1, the closer to 1 the older the packet. For example: $g(x) = 1 - \exp(-x)$ is one such function.

Finally, av(x,y) is a function that takes two values between 0 and 1 and produces an averaged value, for example:

$$av(x, y) = \frac{x + y}{2} \quad [4]$$

$$av(x, y) = \sqrt{xy} \quad [5]$$

f(x,y) is a function that takes two positive integer values ix, and is a function that takes two positive integer values x,y (packet length) and produces a value between 0 and 1 which increases the closer the packets get in length.

Examples of such functions include:

$$f(x, y) = \frac{|x - y|}{x} \quad [6]$$

$$f(x, y) = \frac{|x - y|}{y} \quad [7]$$

$$f(x, y) = \frac{|x - y|}{\max(x, y)} \quad [8]$$

and other similar functions

In a variation, if the RN did not receive a packet for a certain time length T_out (usually predefined by the network design and should depend on the allowed roundtrip time), then it proceeds to match and transmit the already buffered packets (starting with the oldest one) either with or without network coding, matching these by length where possible.

To extend the process described above to more than 2 ENs in the present context, the network coded packet must be a code of only two original packets (so that each receiving terminal does not know only one of the source packets coded into any network coded one). Thus, the RN must pair up the ENs into network coded pairs. Such pairing may be static (i.e. two ENs are paired with each other as a matter of link or RN configuration) or dynamic (on a packet-by-packet basis).

If the pairing is static the process as per FIG. 8 (either Method 1 or Method 1a) is used. However, for any substantially large number of ENs the number of pairs may be quite large and the process as per FIG. 7 is more efficient. If the pairing is dynamic, the process as per FIG. 8 becomes problematic. It is, therefore, assumed that the procedure in FIG. 7 is followed according to either of the approaches (base method (Method 1) or its modifications (Methods 1a, 1b, 1c) as described above.

3. Operation of the EN

Having described the operation of RN, the operation of EN is now described in greater detail. The EN contains two MAC packet buffers (these are "logical" and can be implemented in any reasonable fashion). The first is a standard MAC packet buffer. This contains a queue of packets to be transmitted. Once a packet is transmitted and reception is acknowledged (if acknowledgement is used in the connection), the packet is removed from this buffer.

Typically, the transmitted packet is discarded. However, in the presence of network coding at the RN, the packet is placed into the network coding buffer. The buffer contains N packets and when a new packet needs to be placed in the buffer—and the buffer is full—the oldest is deleted (thus the buffer may be implemented as a First In First Out (FIFO)/queue). Other operations on the buffer as well as how its size (N) is determined are discussed below.

To properly understand the buffer operation and design, the base approach for RN is used. In the base approach for the RN, there were only two ENs, and the RN buffers at most one (1) packet from each EN. If the transmission and reception processing of packets at the EN and RN were instantaneous, a single packet queue at the EN would suffice. Unfortunately, the packet processing is not instantaneous. Moreover, while in some systems it is specified what the "network coding" delay is, in other systems this is unknown, except for some specified upper limit.

Therefore, the EN needs to buffer more than one packet. Moreover, while the RN buffers only 1 packet, the EN does not necessarily know which of its packets the RN actually used to create a network coded packet. In this case, there must be a method for an RN to signal which packet is used. One way to accomplish this is to label each packet with an index modulo-N as it is transmitted and stored in the network coding queue of the EN. Because N is typically small, this requires minimal overhead (e.g. a 4-bit (register) can support $N \leq 16$ that suffices for most systems).

Figure 11:
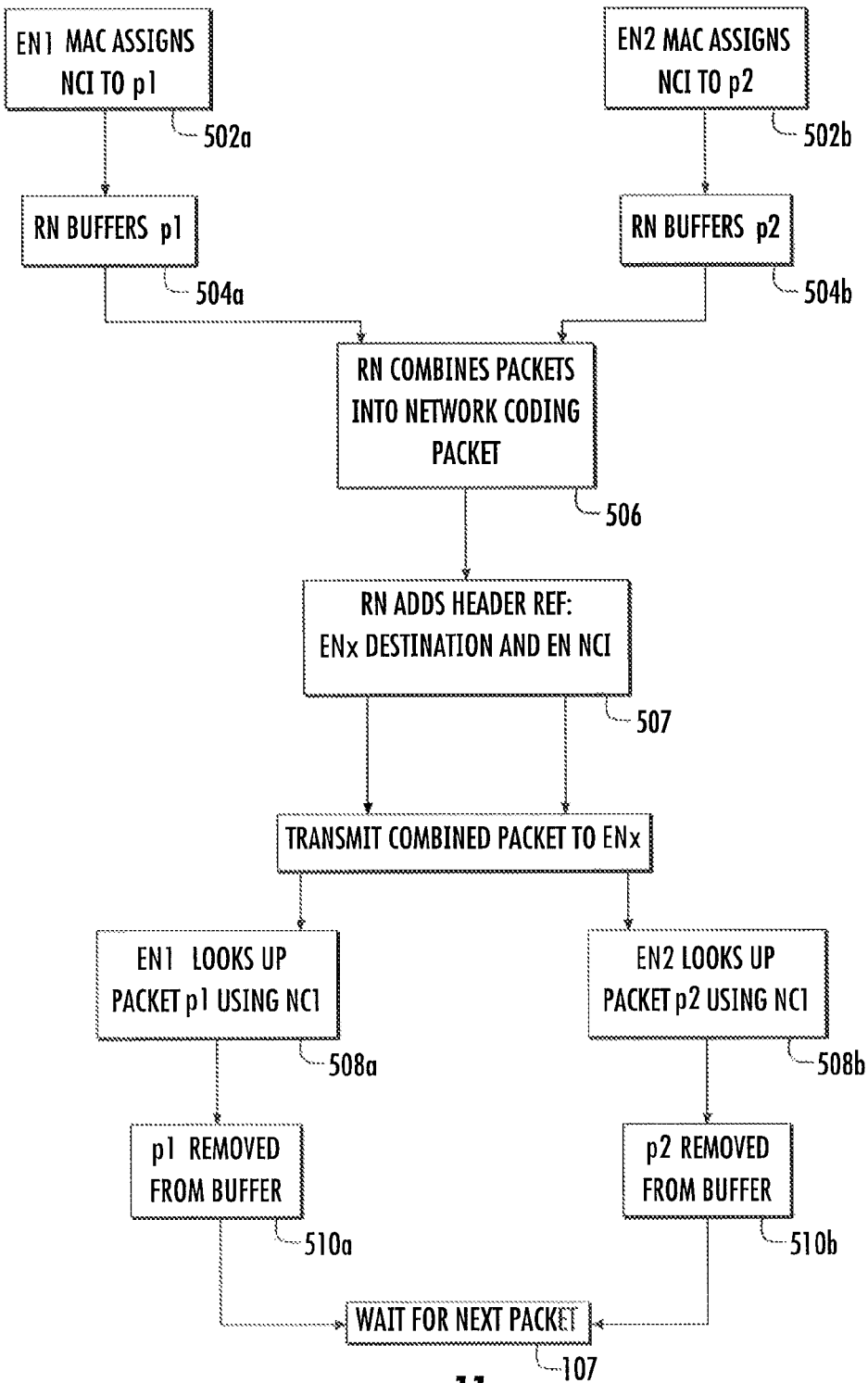
FIG. 11 shows a network coding operation.

The network coding operation is shown in FIG. 11. First, each packet p1, p2 is assigned a Network Coding Index (NCI) by the EN's MAC 502a, 502b. The NCI should have a modulus equal to (or greater than) the network coding buffer size that the EN is required to keep (i.e. modulus greater than or equal to N), and the EN may buffer the packet p1, p2 before transmission to the RN 504a, 504b.

When the RN combines two packets into a network coding packet 506, it includes the following information in the header of the network coded packet: (1) the address of the first destination EN and the NCI of that EN's packet that was coded; and (2) the address of the second destination EN and the NCI of that EN's packet that was coded. It does this at step 507 before transmission of the combined packet.

Finally, the EN, upon receiving a network coded packet p2 intended for it, looks up its own packet using the NCI and uses this for network decoding 508a, 508b. Upon successful network decoding, the packet is removed from the buffer 510a, 510b.

This approach can be extended to a case of more than 2 ENs and the various operational modes where the RN requires more than one packet buffer. For example, suppose that the RN stores at most M packets from each EN. The value of M is determined based on the system parameters. Each EN then needs to have N>M packet storage in its network coding buffer with N-M greater than the latency required for processing and transmission. The NCI is used as above. The operation does not depend on the total number of ENs in the system, except that this may impact the computation of M. The packet reception and decoding proceeds as above and when a packet in an EN's buffer has been used for network decoding, it is removed from the buffer.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for network coding packets comprising:
a node receiving a packet from a source node that is the source of the packet, the node including a plurality of buffers that include at least a source buffer associated with the source node and a non-source buffer associated with a non-source node;

the node determining whether the non-source buffer has at least one existing packet buffered;

on a condition that the non-source buffer does not have at least one existing packet buffered, the node storing the packet in the source buffer; and on a condition that the non-source buffer has at least two existing packets buffered, the node network coding the packet with the one of the at least two existing packets buffered in the non-source buffer that is closest in size to the packet.

2. The method of claim 1, further comprising the node sending out an existing packet from the source buffer on a condition that the non-source buffer does not have at least one existing packet buffered.

3. The method of claim 1, further comprising the node emptying the non-source buffer in response to the node network coding the packet with the one of the at least two existing packets buffered in the non-source buffer that is closest in size to the packet.

4. The method of claim 1, wherein the node network codes the packet with the one of the at least two existing packets buffered in the non-source buffer that is closest in size to the packet using an XOR operation that does not require the packet and the one of the at least two existing packets to have an identical number of bits.

5. The method of claim 1, wherein, in response to two packets arriving simultaneously at the node, the node arbitrarily considers either of the packets to be received first.

6. The method of claim 1, further comprising:
buffering multiple packets in each of the plurality of buffers at the node; and
in response to a packet from one of the plurality of buffers being used, removing the used packet from the one of the plurality of buffers.

7. The method of claim 6, further comprising:
modifying the multiple packets such that the multiple packets contain identifiers; and
on a condition that the node receives a new packet from a different node for which the node has existing packets stored:
the node sending an oldest packet out without network coding and buffering the new packet in the source buffer, or
the node network coding the new packet with an existing packet from the non-source buffer, and, on a condition that the non-source buffer is empty, buffering the new packet in the buffer corresponding to the different node.

8. The method of claim 7, wherein the identifiers comprise message bits.

9. The method of claim 1, further comprising the node looking up existing packets in the plurality of buffers at the node to choose an appropriately-sized pairing between an existing packet and the packet.

10. The method of claim 7, wherein a latency constraint is imposed at the node when one of the plurality of buffers is full.

11. The method of claim 7, wherein, on a condition that the node does not receive a packet for a certain length of time, the node transmits already-buffered packets starting with an oldest packet with or without network coding.

12. A wireless node comprising:
a receive unit configured to receive a packet from a source node that is the source of the packet;
a plurality of buffers that include at least a source buffer associated with the source node and a non-source buffer associated with a non-source node; and
a processing unit configured to:
determine whether the non-source buffer has at least one existing packet buffered,
on a condition that the non-source buffer does not have at least one existing packet buffered, store the packet in the source buffer, and
on a condition that the non-source buffer has at least two existing packets buffered, network code the packet with the one of the at least two existing packets buffered in the non-source buffer that is closest in size to the packet.

13. The wireless node of claim 12, wherein the processing unit is further configured to send out an existing packet from the source buffer on a condition that the non-source buffer does not have at least one existing packet buffered.

14. The wireless node of claim 12, wherein the processing unit is further configured to empty the non-source buffer in response to the processing unit network coding the packet with the one of the at least two existing packets buffered in the non-source buffer that is closest in size to the packet.

15. The wireless node of claim 12, wherein the processing unit is further configured to code the packet with the one of the at least two existing packets buffered in the non-source buffer that is closest in size to the packet using an XOR operation that does not require the packet and the at least two existing packets to have an identical number of bits.

16. The wireless node of claim 15, wherein, in response to two packets arriving simultaneously at the node, the processing unit is further configured to arbitrarily consider either of the packets to be received first.

17. The wireless node of claim 12, wherein the processing unit is further configured to:
buffer multiple packets in each of the plurality of buffers; and
in response to a packet from one of the plurality of buffers being used, remove the used packet from the one of the plurality of buffers.

18. The wireless node of claim 17, wherein the processing unit is further configured to:
modify the multiple packets such that they contain identifiers; and
on a condition that the node receives a new packet from a different node for which the node has existing packets stored:
send an oldest packet out without network coding and buffer the new packet in the source buffer, or
network code the new packet with an existing packet from the non-source buffer, and, on a condition that the non-source buffer is empty, buffer the new packet in the buffer corresponding to the different node.

19. The wireless node of claim 18, wherein the identifiers comprise message bits.

20. The wireless node of claim 12, wherein the processing unit is further configured to look up existing packets in the plurality of buffers to choose an appropriately-sized pairing between an existing packet and the packet.

* * * * *